United States Patent
Maguire

(10) Patent No.: US 11,601,854 B2
(45) Date of Patent: Mar. 7, 2023

(54) METHOD AND APPARATUS FOR HANDOVER AT NETWORK SLICE COVERAGE BOUNDARY

(71) Applicant: Telefonaktiebolaget LM Ericsson (PUBL), Stockholm (SE)

(72) Inventor: Patrick Maguire, County Westmeath (IE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 26 days.

(21) Appl. No.: 17/267,394

(22) PCT Filed: Aug. 14, 2018

(86) PCT No.: PCT/EP2018/072071
§ 371 (c)(1),
(2) Date: Feb. 9, 2021

(87) PCT Pub. No.: WO2020/035136
PCT Pub. Date: Feb. 20, 2020

(65) Prior Publication Data
US 2021/0297910 A1    Sep. 23, 2021

(51) Int. Cl.
*H04W 4/00* (2018.01)
*H04W 36/00* (2009.01)
(Continued)

(52) U.S. Cl.
CPC ........ *H04W 36/00835* (2018.08); *H04W 36/0058* (2018.08); *H04W 36/22* (2013.01); *H04W 48/20* (2013.01)

(58) Field of Classification Search
CPC ......... H04W 36/0005; H04W 36/0055; H04W 36/0058; H04W 36/0083;
(Continued)

(56) References Cited

U.S. PATENT DOCUMENTS

| | | | |
|---|---|---|---|
| 8,391,872 B1* | 3/2013 | Shetty | H04W 36/30 455/443 |
| 2008/0085712 A1* | 4/2008 | Han | H04W 36/04 455/440 |
| 2018/0152958 A1* | 5/2018 | Arnold | H04L 41/5009 |

FOREIGN PATENT DOCUMENTS

| | | |
|---|---|---|
| WO | 2017 140341 A1 | 8/2017 |
| WO | 2018 083664 A1 | 5/2018 |
| WO | 2018 128076 A1 | 7/2018 |

OTHER PUBLICATIONS

3GPP TS 23.501 v1.4.0; Technical Specification; 3rd Generation Partnership Project; Technical Specification Group Services and System Aspects; System Architecture for the 5G system; Stage 2 (Release 15)—Sep. 2017.
(Continued)

*Primary Examiner* — Matthew W Genack
(74) *Attorney, Agent, or Firm* — Baker Botts L.L.P.

(57) ABSTRACT

In one example aspect, a method of handover is provided. The method comprises determining a first handover candidate list for a first user equipment (UE). The first UE is connected to a first cell and is associated with a first network slice. In response to a determination that the first handover candidate list indicates no valid candidate target cells for handover of the first UE, the method comprises determining a second handover candidate list for a second UE, wherein the second UE is connected to the first cell, and causing the second UE to handover to a second cell indicated in the second handover candidate list.

19 Claims, 3 Drawing Sheets

(51) Int. Cl.
*H04W 36/22* (2009.01)
*H04W 48/20* (2009.01)

(58) Field of Classification Search
CPC ..... H04W 36/00835; H04W 36/00837; H04W 36/22; H04W 36/24; H04W 48/20; H04W 72/0486; H04W 72/1252
See application file for complete search history.

(56) References Cited

OTHER PUBLICATIONS

PCT Notification of Transmittal of the International Search Report and The Written Opinion of the International Searching Authority, or the Declaration issued for International application No. PCT/EP2018/072071—dated Oct. 25, 2018.
A Deliverable By the NGMN Alliance, NGMN 5G White Paper version 1.0; Project: NGMN 5G Initiative; Editor/Submitter: Rachid El Hattachi/Javan Erfanian—Feb. 17, 2015.

* cited by examiner

METHOD AND APPARATUS FOR HANDOVER AT NETWORK SLICE COVERAGE BOUNDARY

PRIORITY

This nonprovisional application is a U.S. National Stage Filing under 35 U.S.C. § 371 of International Patent Application Serial No. PCT/EP2018/072071 filed Aug. 14, 2018 and entitled "Method and Apparatus for Handover at Network Slice Coverage Boundary" which is hereby incorporated by reference in its entirety.

TECHNICAL FIELD

Examples of the present disclosure relate to handover, for example of devices that are associated with a network slice and are near the edge of a serving cell.

BACKGROUND

Mobility in mobile or wireless networks (including for example 5G networks) may allow the handover of a User Equipment (UE) to another cell, beam or frequency. This may occur for example because the UE is experiencing a large amount of interference, for example when the UE is close to the edge of a coverage area of the serving cell. The UE may be handed over to another cell, whereby the another cell becomes the serving cell for the UE. The UE may experience a higher signal to interference and noise ratio (SINR) for signals from the cell to which it was handed over.

A UE may be associated with a network slice. Network slicing allows one or more virtual networks to be created on top of a common shared physical network. In some networks, such as for example 5G or New Radio (NR) networks, the finest granularity of a service area restriction is a Tracking Area (TA). A TA is a logical entity representing the aggregation of one or many cells. Therefore, the minimum coverage of any slice is one TA. The physical network can be configured to associate a deployed network slice within one or more tracking areas associated with the network slice. The TA(s) associated with the network slice define the area within which devices and UEs associated with the network slice are restricted.

In some networks, a cell and its associated physical radio resources are shared and not dedicated to a particular network slice. Therefore, resources of a tracking area and its associated cells may be shared by devices and UEs that are permitted access to services in all deployed networks requiring this coverage, as well as those not associated to any particular network slice.

SUMMARY

One aspect of the present disclosure provides a method of handover. The method comprises determining a first handover candidate list for a first user equipment (UE). The first UE is connected to a first cell and is associated with a first network slice. In response to a determination that the first handover candidate list indicates no valid candidate target cells for handover of the first UE, the method comprises determining a second handover candidate list for a second UE, wherein the second UE is connected to the first cell, and causing the second UE to handover to a second cell indicated in the second handover candidate list.

Another aspect of the present disclosure provides apparatus for handover. The apparatus comprises processing circuitry and a memory. The memory contains instructions executable by the processing circuitry such that the apparatus is operable to determine a first handover candidate list for a first user equipment (UE), wherein the first UE is connected to a first cell and is associated with a first network slice, and in response to a determination that the first handover candidate list indicates no valid candidate target cells for handover of the first UE, determine a second handover candidate list for a second UE, wherein the second UE is connected to the first cell, and cause the second UE to handover to a second cell indicated in the second handover candidate list.

A further aspect of the present disclosure provides apparatus for handover. The apparatus is configured to determine a first handover candidate list for a first user equipment, UE, wherein the first UE is connected to a first cell and is associated with a first network slice, and in response to a determination that the first handover candidate list indicates no valid candidate target cells for handover of the first UE, determine a second handover candidate list for a second UE, wherein the second UE is connected to the first cell, and cause the second UE to handover to a second cell indicated in the second handover candidate list.

A still further aspect of the present disclosure provides apparatus for handover. The apparatus comprises a first determining module configured to determine a first handover candidate list for a first user equipment, UE, wherein the first UE is connected to a first cell and is associated with a first network slice. The apparatus also comprises a second determining module configured to determine a second handover candidate list for a second UE in response to a determination that the first handover candidate list indicates no valid candidate target cells for handover of the first UE, wherein the second UE is connected to the first cell. The apparatus further comprises a causing module configured to cause the second UE to handover to a second cell indicated in the second handover candidate list in response to the determination that the first handover candidate list indicates no valid candidate target cells for handover of the first UE.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
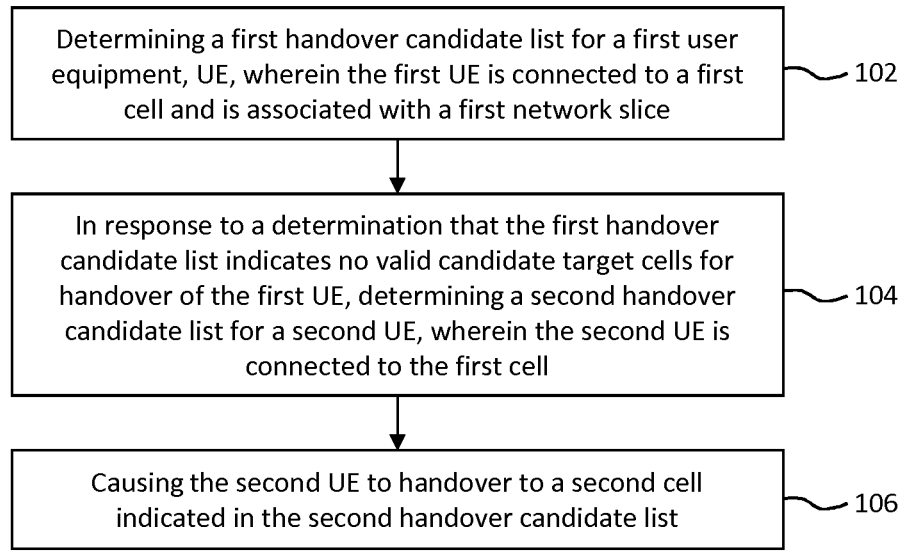
FIG. 1 is a flow chart of an example of a method of handover.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In some cases, a UE at an edge of a coverage area of a serving cell (i.e. the cell to which it is connected) may be in need of handover because it may be experiencing relatively high interference. For example, a neighbour cell's signal strength may be relatively strong compared to the serving cell. In some examples, a cell at high load (e.g. a large number of connected and/or active devices) may have an effective coverage area that is less than that at low load. For example, a heavily loaded cell may adjust its antenna tilt and/or transmission power to reduce its size and force some UEs to handover to other cells. This may cause a UE to become a suitable candidate for handover to another cell as radio conditions at cell edge deteriorate due to the reduction of the cell size. However, the UE which has now become a suitable candidate for handover may be associated with a network slice (e.g. it may be assigned a Single Network Slice Selection Assistance Information, S-NSSAI) and the cell may be at the coverage border of the network slice. In other words, the neighbour cells may not provide coverage for the network slice. In such a scenario, if the UE is handed over to another cell that does not provide coverage for the network slice, it will not be provided coverage by the new cell and thus may experience loss of connectivity or discontinuity of a service.

In examples described herein, one or more devices or UEs may be connected to a cell along with the UE that is associated with a network slice. If the UE associated with the network slice cannot be handed over to a neighbour cell as any candidate target cell for the UE does not provide coverage for the network slice, one or more other devices or UEs may be handed over instead in an attempt to improve network or radio conditions for the UE. In other words, by reducing the load on the cell by handing over other UEs, the cell may, for example, re-adjust its antenna tilt and/or transmission power in response to the reduced load to increase its size, thereby improving the radio conditions for the UE which was previously experiencing deteriorating radio conditions.

FIG. 1 is a flow chart of an example of a method 100 of handover. The method 100 may in some examples be carried out by a network node, such as for example an eNB associated with a first UE. Step 102 of the method comprises determining a first handover candidate list for a first UE, wherein the first UE is connected to a first cell and is associated with a first network slice. Determining the first handover candidate list may comprise for example receiving the list from the UE, or determining the list from measurements of signals provided by the UE. For example, the measurements may be signal strength measurements of signals received from neighbour cells by the UE.

In some cases, the first handover candidate list for the first UE indicates no valid candidate target cells for handover. For example, the list may be empty, as the signal strength from neighbour cells may not be strong enough to be considered as target cells. In some examples, the list may indicate cells that do not offer coverage for the first network slice, and hence are not considered as valid target cells for the UE. In some examples, invalid cells (e.g. those that do not offer coverage for the first network slice) may be removed from the list or not added to the list.

Step 104 of the method comprises, in response to a determination that the first handover candidate list indicates no valid candidate target cells for handover of the first UE, determining a second handover candidate list for a second UE, wherein the second UE is connected to the first cell. The second handover candidate list for the second UE may be for example received from the second UE or determined based on measurements of signals by the UE. The second candidate list may in some examples be determined periodically, in response to signal conditions measured by the second UE, and/or in response to some action from the network such as an instruction to take measurements or provide a handover candidate list.

The second handover candidate list may indicate at least one valid handover target cell for the second UE. For example, the second UE may not be associated with a particular network slice. Alternatively, for example, the second UE may be associated with a network slice, and cells in the second handover candidate list may provide coverage for the network slice. The network slice may be for example the first network slice or another network slice.

Step 106 of the method 100 comprises causing the second UE to handover to a second cell indicated in the second handover candidate list. For example, an instruction may be sent to the second UE to hand over to the second cell. This may improve conditions in the first cell so as to for example increase the effective coverage area of the first cell, and/or improve radio conditions for the first UE, for example by reducing interference or offering additional resources.

Figure 2:
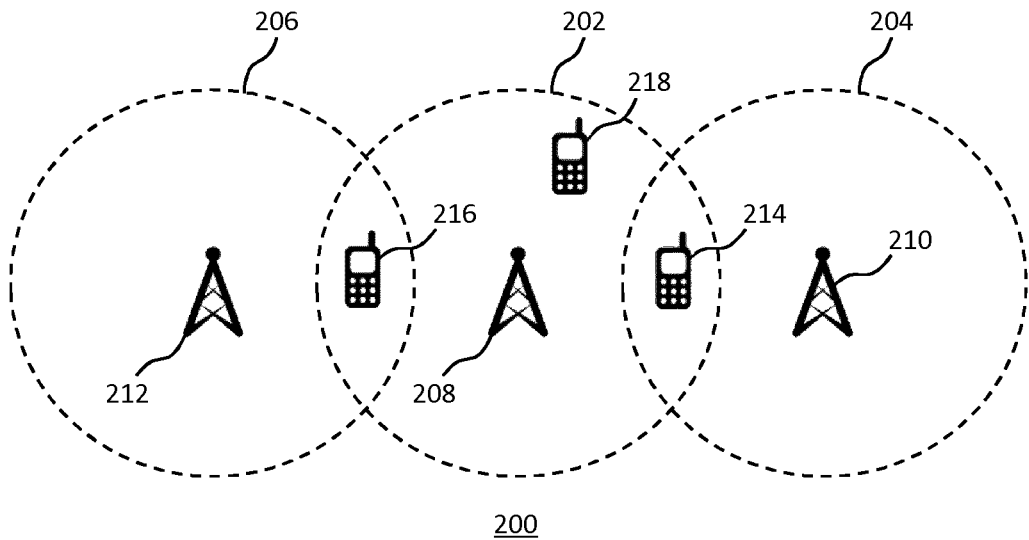
FIG. 2 shows an example of a network.

FIG. 2 shows an example of a network 200 (e.g. wireless communications network). The network 200 comprises cells 202, 204 and 206, enabled for example by base stations 208, 210 and 212 respectively. In the example shown, a first network slice is provided by cells 202 and 204, whereas cell 206 does not provide coverage for the network slice. For example, the cell 206 may be in a tracking area (TA) that is not associated with the network slice, whereas cells 202 and 204 may be in a TA or respective TAs that are associated with the network slice.

In the example network 200 shown, UEs 214, 216 and 218 are connected to the cell 202. UE 214 is close to the edge of the cell 202 and is within the coverage area of cell 204. UE 216 is close to the edge of the cell 202 and is within the coverage area of the cell 212. UE 218 is close to the edge of cell 202 but is not within the coverage area of another cell.

In an illustrative example, UE 216 may be a candidate for handover, for example because it is experiencing low SINR or signal strength from the cell 202. However, it may be associated with a first network slice that is not offered by cell 206. Therefore, a handover candidate list for the UE 216 may indicate no available target cells or may indicate cell 206, which is not valid for the UE 216. Hence another UE may be chosen for handover. UE 218 may first be considered, due to any suitable criteria. For example, UE 218 may not be associated with a network slice. Such UEs or devices may be considered for handover first as they are not restricted by coverage areas of network slices and hence may be likely to have more valid target handover cells. However, in this example there is no cell that offers coverage for UE 218 and hence it is not handed over. The UE 214 may also be considered for handover, for example as a first possibility or after UE 218 has been considered. The UE 214 may for example be associated with a second network slice that is provided by cells 202 and 204. In some examples, UEs associated with a network slice may be considered after those not associated with a network slice due to the likelihood of a lower number of valid target cells. In a refinement, UEs associated with the first network slice (offered by cells 202 and 204, but not by cell 206) may be considered after UEs associated with a different network slice, because cell 202 is at the coverage border of the first network slice. In other examples, UEs may be considered in a different order based on any suitable criteria. For example, a particular network slice may provide critical services and hence UEs associated with the critical network slice may be considered for handover after other UEs. In some examples, UEs considered for handover may comprise those UEs that are handover candidates or meet certain criteria (e.g. a SINR or signal strength from the cell 202 that is below a threshold level, or any other criteria).

In some examples, the method 100 comprises determining the first handover candidate list in response to a determination that the first UE is a candidate for handover to a cell other than the first cell. For example, it may be determined that the first UE meets certain criteria (e.g. a SINR or signal strength from the cell 202 that is below a threshold level, or any other criteria). In other examples, the first UE may be determined to be a handover candidate in any suitable manner.

In some examples, the method 100 comprises determining the first handover candidate list in response to a determination that a load of the first cell is above a predetermined or threshold level. For example, the coverage area of the first cell may be considered to be reduced in this scenario. Thus, the network or first cell may choose to hand over one or more UEs in an attempt to reduce the load. Hence, a respective handover candidate list may be determined for one or more UEs. The load on the cell may be determined from, for example, the number of connected and/or active devices and UEs, the traffic throughput for the cell, and/or any other suitable criteria.

In some examples, the method 100 comprises selecting the second UE for handover from a plurality of UEs that are not associated with the first network slice. As indicated above, such UEs may be considered for handover first (e.g. after the first UE) as they may have a larger number of cells to which they can be handed over to compared to UEs associated with the first network slice. In some examples, the plurality of UEs are not associated with any network slice. Alternatively, the plurality of UEs are associated with a second network slice. The second cell may be associated with the second network slice, i.e. the second cell provides coverage for the second network slice. In some examples, the second network slice is providing less critical services that a third network slice, as UEs associated with third network slice may not be chosen for handover or may be handed over after other UEs, for example those associated with the second network slice, have been considered for handover.

In some examples, the method 100 comprises forming groups of UEs. For example, the method 100 comprises forming a first group of UEs comprising UEs of the plurality of UEs that are not associated with any network slice and have at least one valid target handover cell, forming a second group of UEs comprising UEs of the plurality of UEs that are associated with a second network slice and have at least one valid target handover cell, and forming a third group of UEs comprising UEs of the plurality of UEs that are associated with the first network slice and have at least one valid target handover cell. UEs for handover may be considered from each group in any suitable order, which may in some examples be configurable by the network. In an example, the first group is considered first, the second group is considered second, and the third group is considered third. UEs from each group may be considered (and also may be handed over to other cells) until the group is empty or a certain number of UEs have been handed over (e.g. a predetermined number of UEs have been handed over, or the load on the first cell has fallen below a predetermined or threshold level). Therefore, for example, the method 100 comprises selecting the second UE from the first group if there is at least one UE in the first group, selecting the second UE from the second group if there is at least one UE in the second group and there are no UEs in the first group, and selecting the second UE from the third group if there is at least one UE in the third group and there are no UEs in the first group and the second group. This may in some examples be repeated for a third UE and may also be repeated for further UEs.

Figure 3:
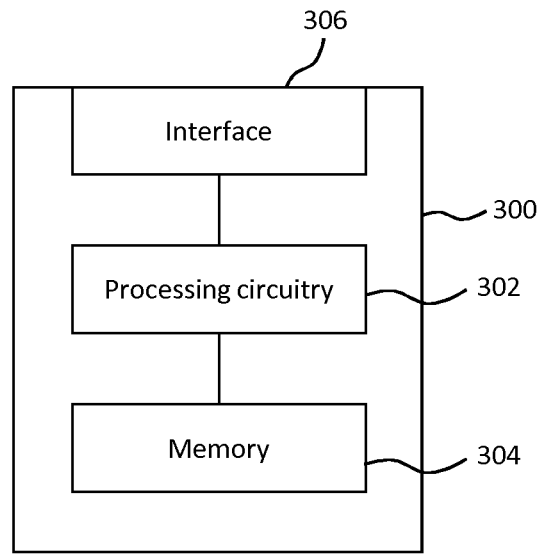
FIG. 3 shows an example of apparatus for handover.

FIG. 3 shows an example of apparatus 300 for handover. The apparatus 300 may be for example a network node or base station. The apparatus 300 comprises processing circuitry 302 and a memory 304. The memory 304 contains instructions executable by the processing circuitry 302 such that the apparatus 300 is operable to determine a first handover candidate list for a first user equipment, UE, wherein the first UE is connected to a first cell and is associated with a first network slice, and in response to a determination that the first handover candidate list indicates no valid candidate target cells for handover of the first UE, determine a second handover candidate list for a second UE, wherein the second UE is connected to the first cell, and cause the second UE to handover to a second cell indicated in the second handover candidate list. The apparatus 300 also comprises an interface 306. In some examples, the apparatus 300 may carry out the method 100 described above with reference to FIG. 1.

Specific example embodiments will now be described below.

Some examples of this disclosure provide a method which may make handover decisions as follows. If a device associated with a network (NW) slice is a candidate for cell handover and a handover candidate list for that device (e.g. UE) has no target cell which is part of NW slice coverage (e.g. because the list is empty or only indicates cells that are not part of the NW slice coverage), the network can:

1. Determine all devices at cell edge (e.g. filtered power evaluation can determine this). These may comprise devices that are determined to be candidates for handover, e.g. based on signal measurements by the devices. In some examples, existing algorithms for determining devices that are handover candidates may be used to determine devices at cell edge.

2. Determine devices which are suitable for handover. These may comprise devices that have at least one valid target cell in their respective handover candidate list.

3. Initiate handover of such devices to reduce the load on current cell and improve the radio conditions at the cell edge.

4. The initiation of handover can be based on:
   a. whether or not a target cell is providing coverage to a NW slice and/or
   b. cell load, which may trigger network initiated handovers of one or more devices until cell load is restored to below this threshold.

Some examples of this disclosure provide an algorithm for NW slices which evaluates, for example under high load conditions, which devices or UEs can be handed over to other cells so as to protect a service level agreement (SLA) for a UE at NW slice coverage borders. In some examples, the algorithm can be triggered at least in the following conditions:
   a. If device associated with a NW slice (e.g. a first network slice) is a candidate for handover, and its handover candidate list has no target cell which is part of the configured NW Slice coverage (e.g. if the list is empty or contains only one or more cells that do not provide coverage for the network slice) and/or
   b. The cell load exceeds a weighting or threshold, which may for example trigger network initiated handovers of devices until the cell load is restored to below this threshold.

The algorithm may, in some examples, determine which devices served by a cell are at a cell edge (for example, filtered power evaluation can determine this), and may group devices as follows:
   Group i: devices which are not associated with any NW slice and have at least one valid target handover cell in their respective handover candidate list.
   Group ii: devices which belong to another NW slice (e.g. other than the first network slice) and have at least one valid target handover cell.
   Group iii: devices which do belong to this NW slice (e.g. the first network slice) and have at least one valid target handover cell. (Thus a UE could be associated with the first network slice but unable to be handed over to a neighbour cell in a tracking area that does not provide the first network slice, but other UEs in the cell and associated with the first network slice could be considered for handover, e.g. if neighbour cells for those other UEs are associated with the first NW slice.)

Depending on the configured priority for handover of specified device groups (e.g. UEs in the three groups specified above can be considered for handover in any specified order), the apparatus 300 carrying out the method 100 can then initiate handover of devices in these groups to reduce the load on the cell and improve the radio conditions at cell edge (i.e. the NW slice coverage border).

Figure 4:
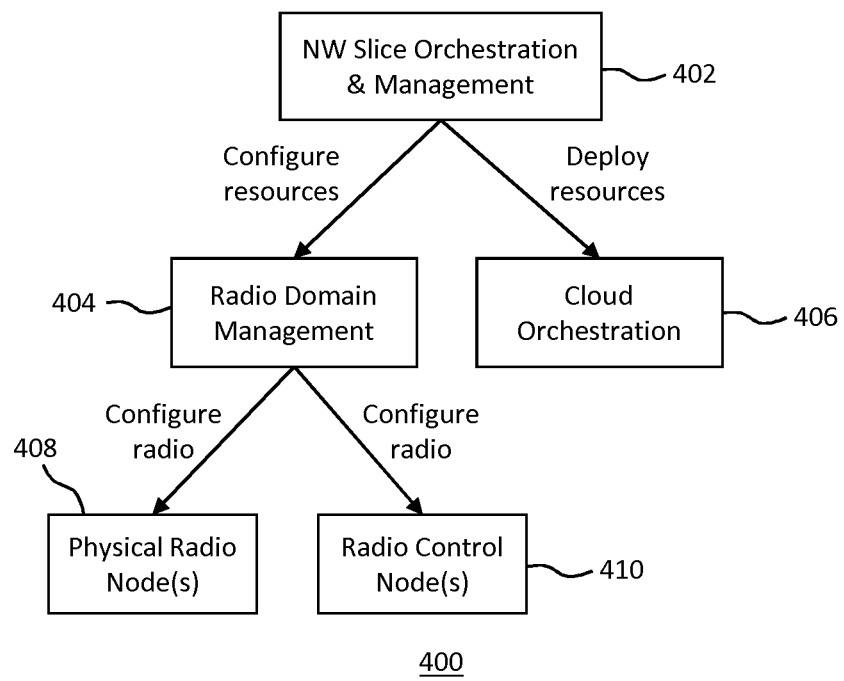
FIG. 4 shows an example of nodes involved in orchestration and management of network slices.

FIG. 4 shows an example of nodes 400 involved in orchestration and management of network slices. The nodes include NW Slice Orchestration & Management node 402, Redio Domain Management node 404, Cloud Orchestration node 406, Physical Radio Node(s) 408 and Radio Control Node(s) 410. To deploy a NW slice, in some examples, the required virtualized resources are first allocated and connected. All resources (both physical and virtual) are then configured to meet the service requirements associated with the specified service request which triggered the NW slice deployment. From a radio perspective, this may imply that the require radio coverage is allocated and associated radio requirements are configured. It is assumed in some examples that pre-configuration at the system or cell level will include a load threshold at which a handover method as described herein will be triggered, and/or performance metrics related to volume of handovers triggered by the method. Deployment of the proposed method may in some examples depend on the radio deployment. For example, in a Long Term Evolution (LTE) Physical Network Function (PNF) deployment, the method may be deployed in every eNodeB (eNB), e.g. the eNBs may carry out the method. In a New Radio (NR) deployment, the method may be deployed in every Radio Control Node, preferably in the ones hosting a Radio Control Function (RCF). In some examples, configuration related to this method, whether at system or cell level, can be controlled from and persisted in a Radio Domain Manager (RDM).

Examples of the present disclosure include apparatus for handover. The apparatus is configured to determine a first handover candidate list for a first user equipment, UE, wherein the first UE is connected to a first cell and is associated with a first network slice, and in response to a determination that the first handover candidate list indicates no valid candidate target cells for handover of the first UE, determine a second handover candidate list for a second UE, wherein the second UE is connected to the first cell, and cause the second UE to handover to a second cell indicated in the second handover candidate list.

Figure 5:
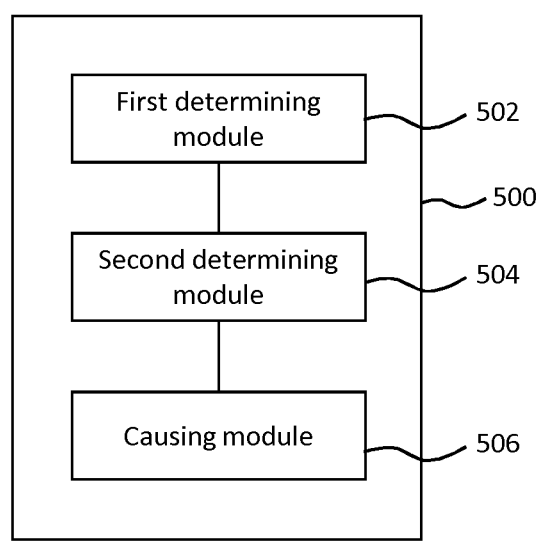
FIG. 5 shows an example of apparatus for handover.

FIG. 5 shows an example of apparatus 500 for handover. The apparatus 500 comprises a first determining module 502 configured to determine a first handover candidate list for a first user equipment, UE, wherein the first UE is connected to a first cell and is associated with a first network slice. The apparatus also includes a second determining module 504 configured to determine a second handover candidate list for a second UE in response to a determination that the first handover candidate list indicates no valid candidate target cells for handover of the first UE, wherein the second UE is connected to the first cell. The apparatus 500 further includes a causing module 506 configured to cause the second UE to handover to a second cell indicated in the second handover candidate list in response to the determination that the first handover candidate list indicates no valid candidate target cells for handover of the first UE.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of handover, the method comprising:
   determining a first handover candidate list for a first user equipment, UE, wherein the first UE is connected to a first cell and is associated with a first network slice; and
   in response to a determination that the first handover candidate list indicates no valid candidate target cells for handover of the first UE:
   determining a second handover candidate list for a second UE, wherein the second UE is connected to the first cell;

causing the second UE to handover to a second cell indicated in the second handover candidate list;
determining that the first handover candidate list indicates at least one further cell, and the first network slice is not associated with the at least one further cell.

2. The method of claim 1, comprising determining the first handover candidate list in response to a determination that the first UE is a candidate for handover.

3. The method of claim 1, comprising determining the first handover candidate list in response to a determination that a load of the first cell is above a predetermined or threshold level.

4. The method of claim 1, comprising selecting the second UE for handover from a plurality of UEs that are not associated with the first network slice.

5. The method of claim 4, wherein the method comprises:
forming a first group of UEs comprising UEs of the plurality of UEs that are not associated with any network slice and have at least one valid target handover cell;
forming a second group of UEs comprising UEs of the plurality of UEs that are associated with a second network slice and have at least one valid target handover cell; and
forming a third group of UEs comprising UEs of the plurality of UEs that are associated with the first network slice and have at least one valid target handover cell.

6. The method of claim 5, comprising:
selecting the second UE from the first group if there is at least one UE in the first group;
selecting the second UE from the second group if there is at least one UE in the second group and there are no UEs in the first group; and
selecting the second UE from the third group if there is at least one UE in the third group and there are no UEs in the first group and the second group.

7. The method of claim 1, further comprising selecting the second UE from UEs that are candidates for handover based on indications of measurements of signals from cells including the first cell.

8. A computer program product comprising non transitory computer readable media having stored thereon a computer program comprising instructions which, when executed on processing circuitry, cause the processing circuitry to carry out a method according to claim 1.

9. Apparatus for handover, the apparatus comprising processing circuitry and a memory, the memory containing instructions executable by the processing circuitry such that the apparatus is operable to:
determine a first handover candidate list for a first user equipment, UE, wherein the first UE is connected to a first cell and is associated with a first network slice; and
in response to a determination that the first handover candidate list indicates no valid candidate target cells for handover of the first UE:
determine a second handover candidate list for a second UE, wherein the second UE is connected to the first cell;
cause the second UE to handover to a second cell indicated in the second handover candidate list;
determine that the first handover candidate list indicates at least one further cell, and the first network slice is not associated with the at least one further cell.

10. The apparatus of claim 9, wherein the memory contains instructions executable by the processing circuitry such that the apparatus is operable to determine the first handover candidate list in response to a determination that the first UE is a candidate for handover.

11. The apparatus of claim 9, wherein the memory contains instructions executable by the processing circuitry such that the apparatus is operable to determine the first handover candidate list in response to a determination that a load of the first cell is above a predetermined or threshold level.

12. The apparatus of claim 9, wherein the memory contains instructions executable by the processing circuitry such that the apparatus is operable to select the second UE for handover from a plurality of UEs that are not associated with the first network slice.

13. The apparatus of claim 12, wherein the plurality of UEs are associated with a second network slice.

14. The apparatus of claim 13, wherein the second cell is associated with the second network slice.

15. The apparatus of claim 13, wherein the second network slice is providing less critical services than services provided by a third network slice.

16. The apparatus of claim 9, wherein the memory contains instructions executable by the processing circuitry such that the apparatus is operable to:
form a first group of UEs comprising UEs of the plurality of UEs that are not associated with any network slice and have at least one valid target handover cell;
form a second group of UEs comprising UEs of the plurality of UEs that are associated with a second network slice and have at least one valid target handover cell; and
form a third group of UEs comprising UEs of the plurality of UEs that are associated with the first network slice and have at least one valid target handover cell.

17. The apparatus of claim 16, wherein the memory contains instructions executable by the processing circuitry such that the apparatus is operable to:
select the second UE from the first group if there is at least one UE in the first group;
select the second UE from the second group if there is at least one UE in the second group and there are no UEs in the first group; and
select the second UE from the third group if there is at least one UE in the third group and there are no UEs in the first group and the second group.

18. The apparatus of claim 9, wherein the memory contains instructions executable by the processing circuitry such that the apparatus is operable to select the second UE from UEs that are candidates for handover based on indications of measurements of signals from cells including the first cell.

19. The apparatus of claim 9 comprising an eNodeB or a Radio Control Node, or a Radio Domain Manager.

* * * * *